United States Patent [19]
Morita

[11] Patent Number: 5,536,459
[45] Date of Patent: Jul. 16, 1996

[54] METHOD OF MANUFACTURING LONG ELASTIC MEMBER MADE OF VULCANIZED RUBBER

[75] Inventor: Hiroyuki Morita, Obu, Japan

[73] Assignee: Tokai Kogyo Kabushiki Kaisha, Obu, Japan

[21] Appl. No.: 424,358

[22] PCT Filed: Aug. 31, 1994

[86] PCT No.: PCT/JP94/01448

§ 371 Date: Apr. 27, 1995

§ 102(e) Date: Apr. 27, 1995

[87] PCT Pub. No.: WO95/06553

PCT Pub. Date: Mar. 9, 1995

[30] Foreign Application Priority Data

Sep. 3, 1993 [JP] Japan ................................ 5-219841

[51] Int. Cl.$^6$ ............................................. B29C 47/90
[52] U.S. Cl. ................ 264/145; 264/167; 264/177.18; 264/178 R; 264/236; 264/285; 264/339; 425/381; 425/466
[58] Field of Search ................................ 264/167, 236, 264/339, 177.16–177.20, 177.10, 285, 173.17, 178 R, 145, 146; 425/466, 381

[56] References Cited

U.S. PATENT DOCUMENTS

| | | | |
|---|---|---|---|
| 3,837,957 | 9/1974 | Mesnel | 264/285 |
| 4,576,773 | 3/1986 | Azzola et al. | 264/167 |
| 4,584,150 | 4/1986 | Ballocca | 264/167 |
| 5,112,547 | 5/1992 | Nakashima et al. | 264/177.2 |
| 5,123,988 | 6/1992 | Iwasa | 264/177.2 |
| 5,183,522 | 2/1993 | Arima | 264/209.3 |
| 5,240,664 | 8/1993 | Hayashi et al. | 264/167 |
| 5,256,361 | 10/1993 | Keys | 264/177.19 |
| 5,376,319 | 12/1994 | Arima | 264/167 |
| 5,395,563 | 3/1995 | Goto et al. | 264/167 |
| 5,447,670 | 9/1995 | Ito et al. | 264/167 |

FOREIGN PATENT DOCUMENTS

| | | | |
|---|---|---|---|
| 58-134727 | 8/1983 | Japan | 264/285 |
| 59-182722 | 10/1984 | Japan | . |
| 1-152856 | 10/1989 | Japan | . |
| 1-152854 | 10/1989 | Japan | . |

*Primary Examiner*—Jeffery R. Thurlow
*Attorney, Agent, or Firm*—Dennison, Meserole, Pollack & Scheiner

[57] ABSTRACT

An extrusion molded article is extrusion molded through an extrusion opening of a die. Then, in a vulcanizing bath, the cross-sectional configuration of the extrusion molded article is modified by utilizing shaping means during the process from the start of vulcanization of the extrusion molded article to a semi-vulcanization thereof, and subsequently, vulcanization of the extrusion molded article is completed. In this way, a long elastic member having required elasticity and having a cross-sectional configuration changed to a required one can be easily manufactured.

4 Claims, 6 Drawing Sheets

METHOD OF MANUFACTURING LONG ELASTIC MEMBER MADE OF VULCANIZED RUBBER

TECHNICAL FIELD

The present invention relates to a method of manufacturing a long elastic member made of vulcanized rubber, for example, a long elastic member such as a weather strip.

BACKGROUND ART

In general, elastic members such as weather strips are made of either thermoplastic resin such as PVC containing plasticizer or thermosetting resin known as synthetic vulcanized rubber such as EPDM and SBR.

In some of these long elastic members, each of them is modified in cross section to conform to the configuration of a clearance around a vehicle door or to prevent deformation resulting from buckling at corner sections thereof. Methods of manufacturing such members are described in, for example, Japanese Laid-Open Utility Model Publications Nos. 1-152854 and 1-152856, Japanese Patent Publication No. 59-182722.

Each of the methods disclosed in the above described publications is performed by using an extrusion molding die having a shaping member which is movably mounted in an extrusion opening of the die, in which the shaping member, when an extrusion molded article as the elastic member is extruded from the extrusion opening, is moved toward or away from the extrusion molded article, thereby permitting modification of the cross-sectional configuration of the extrusion molded article.

As described above, in the conventional method in which the shaping member, when an extrusion molded article is extruded from the extrusion opening, is moved toward or away from the extrusion molded article so as to modify the cross-sectional configuration of the extrusion molded article, the extrusion molded article is usually cooled immediately after being passed through the die if the thermoplastic resin is used. Therefore, the molded article is cooled while the configuration as shaped by the shaping member is still maintained. This may form the long elastic member having a desired cross-sectional configuration.

On the other hand, where the extrusion molded article is formed of the synthetic vulcanized rubber such as EPDM, a synthetic vulcanized rubber material exhibits claylike plastic property since it does not have elasticity unless vulcanization treatment is applied thereto. Generally, since the vulcanization treatment can not be sufficiently performed by utilizing a short bath such as a cooling bath for the thermoplastic resin extrusion molded article, the vulcanization treatment is carried out by utilizing a vulcanizing bath having a length of from several tens of meters to hundreds of meters. As should be apparent, a vulcanizing reaction to the synthetic vulcanized rubber has not yet occurred at the vicinity of an inlet of the vulcanizing bath. When the extrusion molded article extruded at temperatures of 100° C. or below is introduced into the vulcanizing bath kept at temperatures of 180° C.–220° C., viscosity of the article is usually temporarily reduced immediately thereafter, and the vulcanizing reaction mainly progresses at an area from the front half toward the middle of the bath.

Therefore, to obtain the molded article having a desired cross-sectional configuration, the cross-sectional configuration of the extrusion molded article has to be sustained to a desired configuration at a position in which the synthetic rubber is in a "semi-vulcanized state", that is, in a state where the vulcanizing reaction is gradually started.

In a case where the extrusion molded article is shaped to the desired cross-sectional configuration by utilizing the shaping member, immediately after being passed through the die as in the conventional technique, the extrusion molded article has to be stably transferred to the middle of the vulcanizing bath, with its condition maintained.

However, in order to accurately harmonize extrusion speed of the extrusion molded article extruded from the die, moving speed of a conveyor for transferring the extruded article and pulling speed of a pulling machine, it is required to take various measures, for example, to substantially increase accuracy of each machine and to additionally provide equipment for harmonization. This may lead to increased investment. Moreover, since extrusion conditions usually vary with changes in ambient temperature, variations in properties of a molding material between lots, and other factors, it is substantially difficult to accurately harmonize such speeds. Also, due to inevitable factors such as vibrations in a factory, the shaped configuration of the extrusion molded article can not be kept and is deformed to an awkward configuration.

DISCLOSURE OF THE INVENTION

In view of the problems associated with the conventional method, an object of the present invention is to provide a method of manufacturing a long elastic member made of vulcanized rubber in which a long elastic member having a required cross-sectional configuration can be easily manufactured.

To attain the above-identified object, the present invention provides a method of manufacturing a long elastic member made of vulcanized rubber wherein a long extrusion molded article is introduced into a vulcanizing bath by delivery means, the extrusion molded article being formed by extruding a vulcanized rubber material through an extrusion opening of an extrusion molding die, and wherein the extrusion molded article is vulcanized in the vulcanizing bath, the method comprising the steps of:

extrusion molding the extrusion molded article through the extrusion opening of the die;

modifying the cross-sectional configuration of a longitudinal section of the extrusion molded article by utilizing shaping means during the process from the start of vulcanization of the extrusion molded article to semi-vulcanization thereof in the vulcanizing bath; and vulcanizing the extrusion molded article to form the long elastic member having required elasticity.

According to this method, a longitudinal section of the extrusion molded article is modified in cross section by utilizing shaping means during the process from the start of vulcanization of the extrusion molded article to semi-vulcanization molded article is vulcanized. Thus, a long elastic member having required elasticity and having a cross-sectional configuration changed to a required one can be easily manufactured.

Further, the shaping means may be a shaping member adapted to contact or move toward or away from the extrusion molded article in the vulcanizing bath.

Further, the shaping means may be a leg strip which is projected from the extrusion molded article, with the amount of projection thereof changed in a longitudinal direction.

The extrusion molded article is conveyed, with the leg strip thereof contacting a jig provided in the vulcanizing bath. This may change the cross-sectional configuration of the extrusion molded article in accordance with the amount of projection of the leg strip. Thus, a long elastic member having required elasticity and having a cross-sectional configuration changed to a required one can be easily manufactured. The elastic member thus formed has less variations.

Moreover, the jig for supporting the leg strip of the extrusion molded article is constituted of a delivery surface of the delivery means. Therefore, it is not necessary to provide a special jig for supporting the leg strip in the vulcanizing bath. Also, no frictional force is produced between the leg strip and the delivery surface due to traveling of the extrusion molded article.

The shaping means may include a leg strip which is projected from the extrusion molded article, with the amount of projection thereof changed in a longitudinal direction, and a shaping member which is adapted to contact the extrusion molded article in the vulcanizing bath. Further, the shaping member may be moved toward or away from a part of the extrusion molded article having the leg strip, depending on the amount of projection of the leg strip of the extrusion molded article, thereby changing the cross-sectional configuration of the extrusion molded article.

The leg strip is removed after vulcanization of the extrusion molded article is completed.

Further, the shaping member is constituted of a shaping roller rotatable in contact with a part of the extrusion molded article. Therefore, a frictional force between the extrusion molded article and the shaping roller is reduced since it is a rolling frictional force. This may effectively eliminate any problems due to the frictional force.

BEST MODE FOR CARRYING OUT THE INVENTION

First Embodiment

A first embodiment according to the present invention will be explained with reference to FIGS. 1 to 7.

Figure 1:
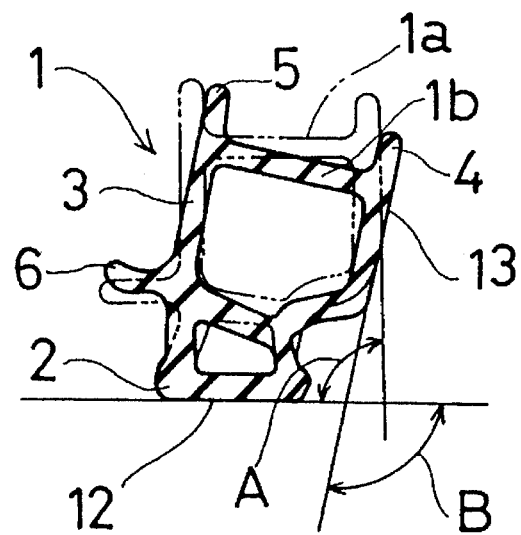
FIG. 1 is a sectional view showing a weather strip according to a first embodiment of the present invention.
Figure 2:
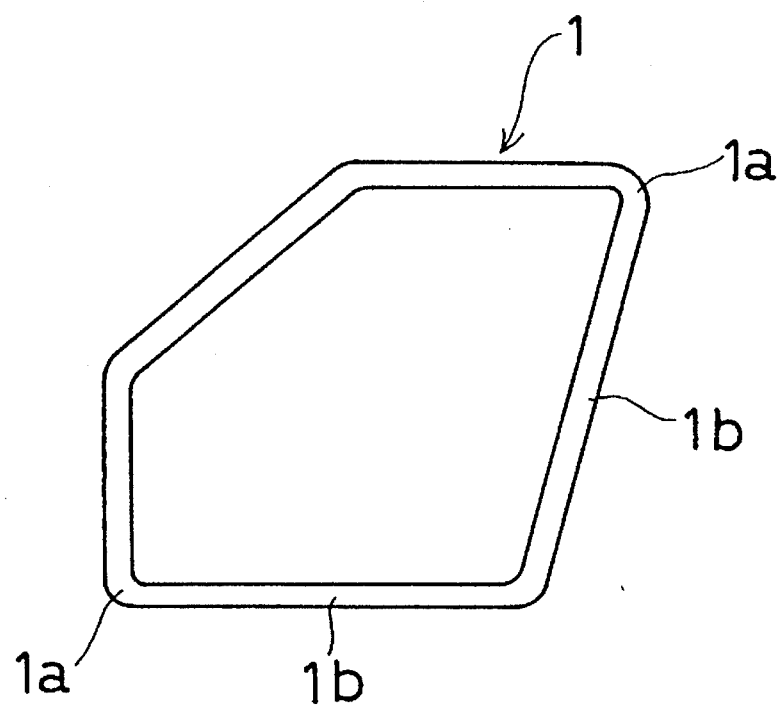
FIG. 2 is an elevational view showing the weather strip of the first embodiment which is bent along a vehicle door.

This embodiment exemplifies a case where a long elastic member made of vulcanized rubber is a weather strip for a vehicle. As shown in FIGS. 1 and 2, the weather strip 1 is of one-piece construction, and includes a mounting portion 2 to be mounted on a vehicle body and a sealing portion 3 for a door. Each of the mounting portion 2 and the sealing portion 3 is formed with an independent longitudinal cavity. Further, the sealing portion 3 is provided with lips 4, 5 and 6 projected therefrom.

The weather strip 1 is annularly mounted around the door. Further, in order to prevent deformation due to buckling at corner sections 1a, a cross-sectional configuration of the weather strip 1 is changed in such a manner that an angle A between a mounting surface 12 of the mounting portion 2 and a side surface 13 of the sealing portion 3 in each of the corner sections 1a is suitably smaller than an angle B in major portions 1b.

Figure 3:
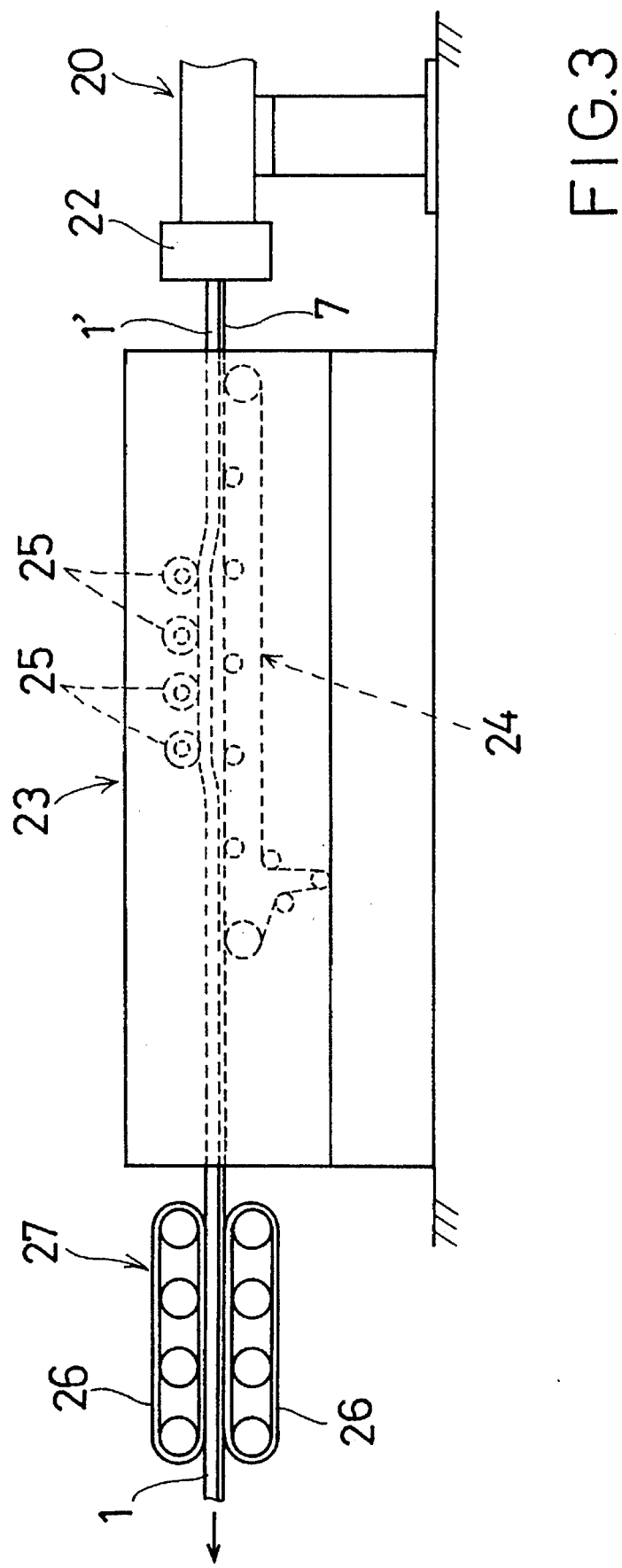
FIG. 3 is an explanatory view illustrating a manufacturing process of the weather strip of the first embodiment.

Referring now to FIG. 3 which shows a production line of the weather strip 1, a die 22 is provided on a forward portion of an extruder 20. A front surface of the die 22 is provided with an extrusion opening 21 which is configured to conform to the cross-sectional configuration of the weather strip 1.

A vulcanizing bath 23 is arranged downstream of the die 22. The vulcanizing bath 23 contains therein a conveyor 24 as delivery means and a plurality of shaping rollers 25 each of which is rotatably positioned at a desired height above a conveyor surface of the conveyor 24.

Further, a pulling machine is arranged downstream of the vulcanizing bath 23. The pulling machine is constituted of a pair of pulling belts 26 vertically separately positioned.

Figure 4:
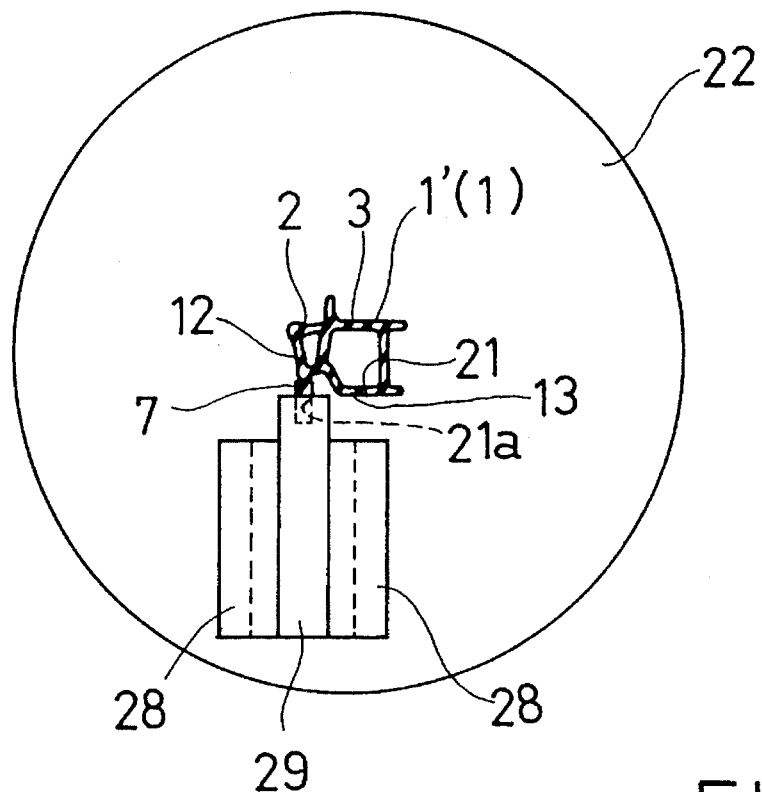
FIG. 4 is an elevational view showing an extrusion molding die used in the first embodiment.
Figure 5:
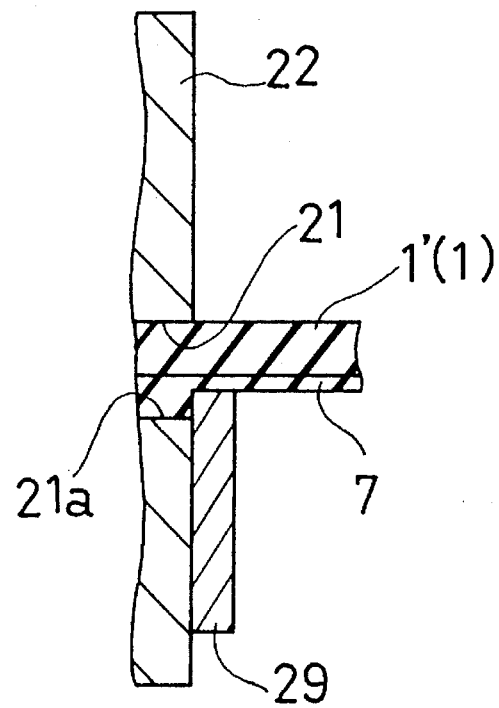
FIG. 5 is a sectional view of the die in the first embodiment.

As shown in FIGS. 4 and 5, the extrusion opening 21 of the die 22 is formed such that the mounting surface 12 of the mounting portion 2 of the weather strip 1 is directed in a lateral direction and that the side surface 13 of the sealing portion 3 is directed downward.

A secondary extrusion opening 21a is formed on the front surface of the die 22 for projectingly forming a leg strip 7 as shaping means on a lower surface of the mounting portion 2. The secondary extrusion opening 21a communicates with the extrusion opening 21.

Moreover, the front surface of the die 22 is provided with a shutter 29 which is moved toward or away from the secondary extrusion opening 21a along guide rails 28. The shutter 29, when moved toward or away from the secondary extrusion opening, may desirably change the amount of projection of the leg strip 7 extruded from the secondary extrusion opening 21a.

A vulcanized rubber material fed from the extruder 20 is extruded from each of the extrusion opening 21 of the die 22 and the secondary extrusion opening 21a. Thus, an extrusion molded article 1' constituting the weather strip 1 is formed by the vulcanized rubber material extruded through the extrusion opening 21. At the same time, the leg strip 7 is integrally formed with the extrusion molded article 1' by the vulcanized rubber material extruded through the secondary extrusion opening 21a.

Figures 7A, 7B:
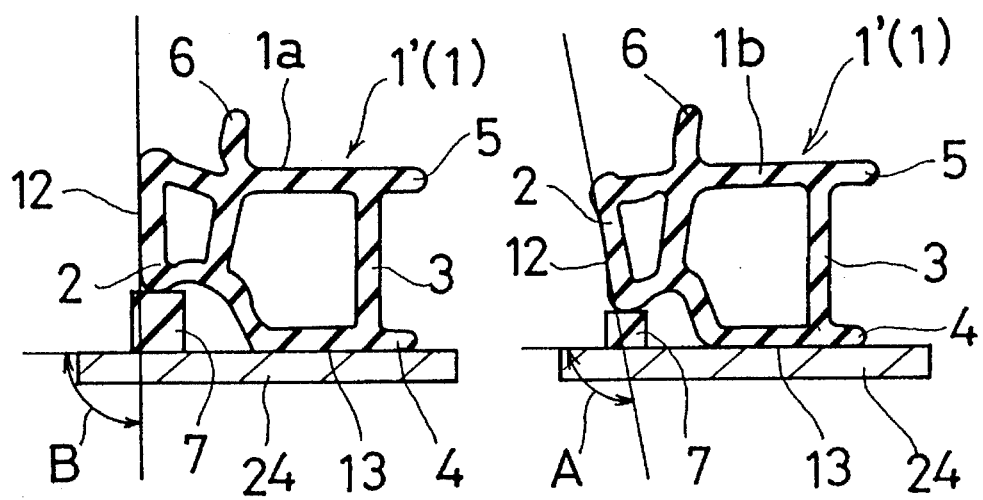
FIG. 7(A) is a sectional view showing a section of the extrusion molded article of the first embodiment of which the cross-sectional configuration is deformed by a leg strip.
FIG. 7(B) is a sectional view showing a section of the extrusion molded article of the first embodiment of which the cross-sectional configuration is maintained to a cross-sectional configuration as extruded.

When the extrusion molded article 1' and the leg strip 7 are extruded as a one-piece member through the extrusion opening 21 and the secondary extrusion opening 21a, respectively, the shutter 29 is moved toward or away from the secondary extrusion opening 21a by an actuating device (not shown). Thus, as shown in FIGS. 5, 7(A) and 7(B), the leg strip 7 is integrally formed with a lower surface of the extrusion molded article 1', while the amount of projection of the leg strip 7 projected from the lower surface of the extrusion molded article 1' is changed.

As described above, the extrusion molded article 1' and the leg strip 7 extruded integrally through the extrusion opening 21 and the secondary extrusion opening 21a are transferred by the conveyor 24 in the vulcanizing bath 23 and are subsequently pulled out by a pulling machine 27.

In the vulcanizing bath 23, the extrusion molded article 1' and the leg strip 7 are conveyed by the conveyor 24, with a lower surface of the leg strip 7 and a part of the extrusion molded article 1' supported on a delivery surface of the conveyor 24 as a jig. During the process from the start of vulcanization of the extrusion molded article 1' to semi-vulcanization thereof, the extrusion molded article 1' is changed in cross section in accordance with the amount of projection of the leg strip 7 as the shaping means.

In the weather strip 1 constituted of the extrusion molded article 1', the angle A between the mounting surface 12 of the mounting portion 2 and the side surface 13 of the sealing portion 3 in each of the corner sections 1a is smaller than the angle B in the major portions 1b at a required angle.

Upon completion of vulcanization of the extrusion molded article 1' in the vulcanizing bath 23, the weather strip 1 having required elasticity is obtained. The weather strip 1 passed through the vulcanizing bath 23 is pulled out by the pulling machine 27 and is severed to a required length by a cutter (not shown) arranged downstream of the pulling machine 27.

Finally, the leg strip 7 of the weather strip 1 is removed by cutting or like operation, if required, thereby forming the weather strip which may be adaptable to the vehicle.

Figure 6:
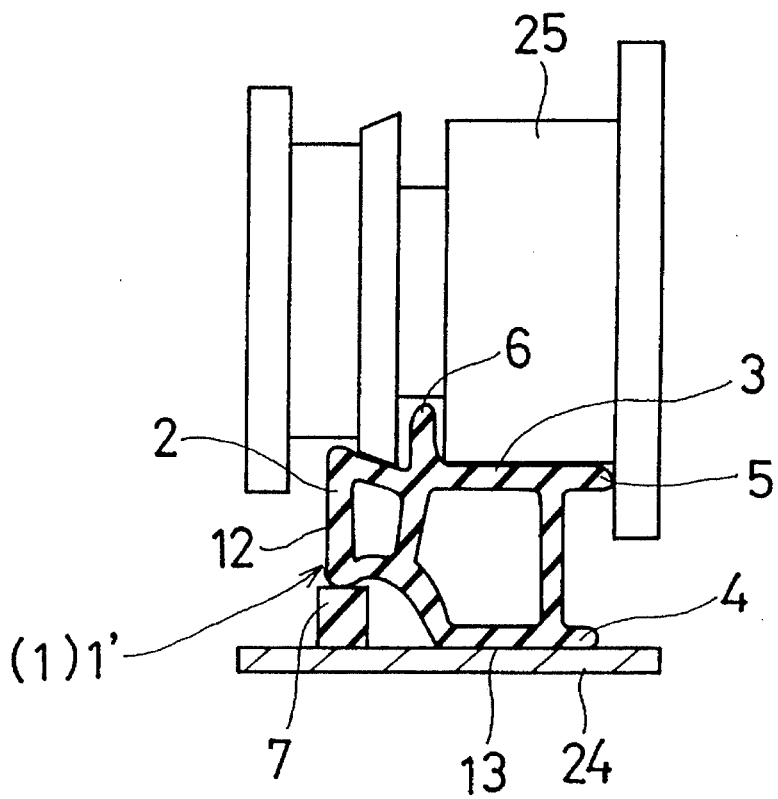
FIG. 6 is a sectional view of an extrusion molded article a part of which is pressed by a shaping roller used in the first embodiment.

In the first embodiment, as shown in FIG. 6, the shaping roller 25 biases and supports a part of the extrusion molded article 1', for example, the sealing portion 3, thus ensuring a stable change in the cross-sectional configuration of the extrusion molded article 1'. However, the shaping roller 25 can be omitted, if required, such that the cross-sectional configuration of the weather strip 1 is changed by the own weight of the extrusion molded article 1', in accordance with the amount of projection of the leg strip 7.

On the contrary, the cross-sectional configuration of the extrusion molded article 1' may be changed by utilizing only the shaping roller 25 in the vulcanizing bath 23 without providing the leg strip 7 on the extrusion molded article 1'.

<Second Embodiment>

A second embodiment according to the present invention will now be explained with reference to FIGS. 8 to 10.

This embodiment exemplifies a case where a long elastic member made of vulcanized rubber is a weather strip to be mounted on an upper edge of a flange of a vehicle door panel. As shown in FIG. 8, the weather strip 101 is of one-piece construction, and includes a mounting portion 102 and a sealing portion 103.

The mounting portion 102 is bent to a substantially inverted U-shaped configuration in cross section so as to be mounted on an edge portion of the flange 111 of the door panel. The mounting portion 102 includes a core member 108 which is embedded in a thickened mid-portion thereof. The core member 108 is formed of a metal strip.

Further, engagement projections 109 are provided on opposite inner wall surfaces of the mounting portion 102. The engagement projections 109 engage the flange to prevent the mounting portion 102 from slipping off.

Moreover, the sealing portion 103 has a tubular configuration.

Figure 8:
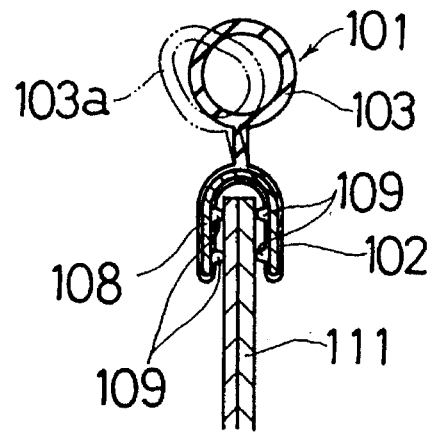
FIG. 8 is a sectional view showing a weather strip according to a second embodiment of the present invention which is mounted on a flange of a door panel.

In the weather strip 101 according to the second embodiment, in order that the weather strip 101 is not undesirably inclined by an arcuate portion of the flange 111 when it is mounted on the edge portion of the flange 111, a section 103a of the sealing portion 103 is inclined in an opposite direction to the inclination direction in cross section thereof, as shown by phantom lines in FIG. 8.

In the second embodiment, when the extrusion molded article is extrusion molded through an extrusion opening of a die, a leg strip 107 is integrally formed with the mounting portion 102 containing the core member 108 therein and having a plate-like form. The leg strip 107 is formed on a one side edge of a lower surface of the mounting portion 102, with the amount of projection thereof changed from zero to a required amount H, as shown in FIGS. 9 and 10.

Figure 9:
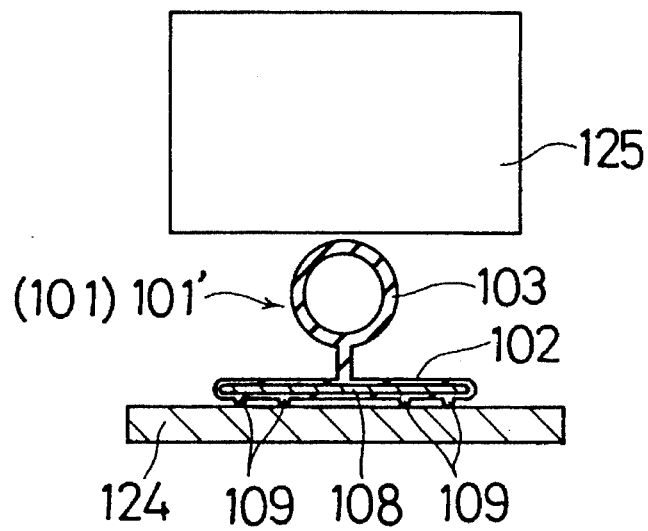
FIG. 9 is a sectional view showing a section of the extrusion molded article of the second embodiment of which the cross-sectional configuration is maintained to a cross-sectional configuration as extruded.
Figure 10:
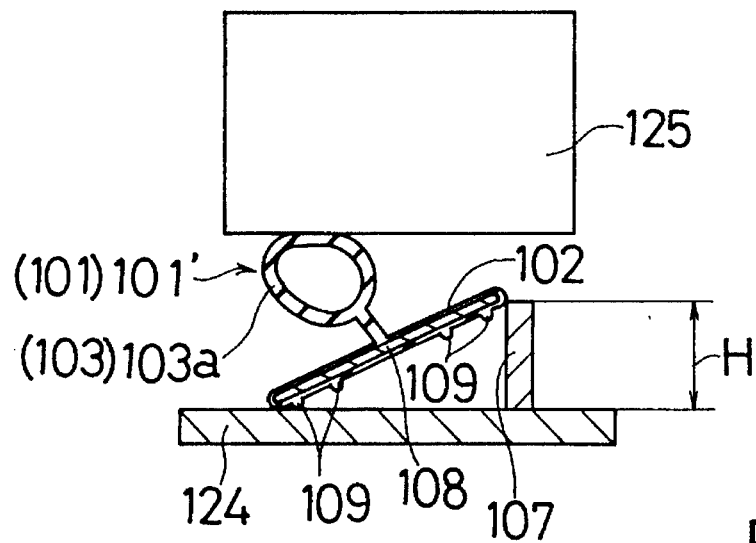
FIG. 10 is a sectional view showing a section of the extrusion molded article of the second embodiment of which the cross-sectional configuration is deformed by a leg strip and a shaping roller.

Thereafter, in a vulcanizing bath positioned downstream of the die, the extrusion molded article and the leg strip are conveyed by a conveyor 124, with the mounting portion 102 changed from a substantially horizontal position to a position inclined at required angles, as shown in FIGS. 9 and 10. The angles depend on the amount of projection of the leg strip 107.

During the process from the start of vulcanization of the extrusion molded article 101' to semi-vulcanization thereof, a shaping roller 125 biases the section 103a of the sealing portion 103 of the extrusion molded article 101', so that the extrusion molded article 101' is changed in cross section depending on the amount of projection of the leg strip 107.

Upon completion of vulcanization of the extrusion molded article 101' in the vulcanizing bath, the weather strip 101 having required elasticity is obtained. The weather strip 101 is pulled out by the pulling machine and is subsequently severed to a required length.

Thereafter, the leg strip 107 is removed and the mounting portion 102 is bent to the inverted U-shaped configuration in cross section, thereby forming the weather strip 101 which is adaptable to the edge portion of the flange 111 of the door, as shown in FIG. 8. Thus, in the second embodiment, shaping means is constituted of the leg strip 107 and the shaping roller 125.

<Third Embodiment>

Figure 11:
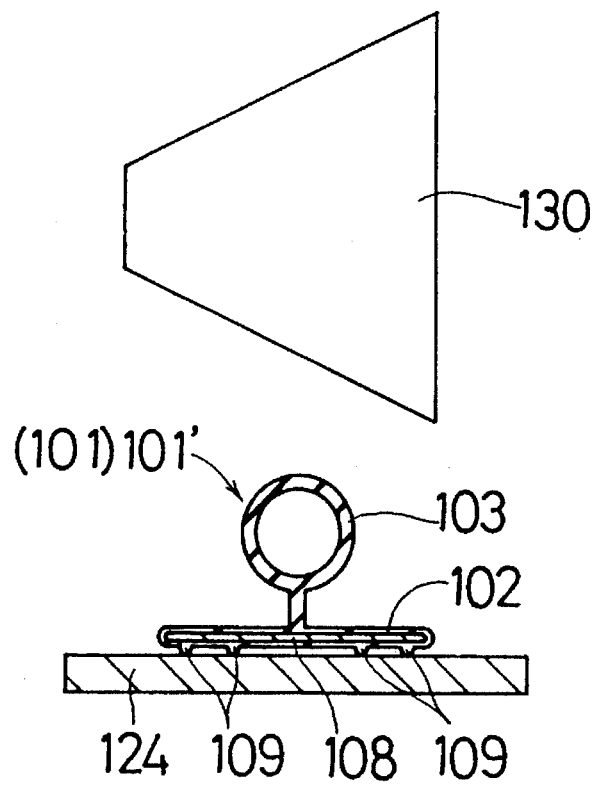
FIG. 11 is a sectional view showing a section of the extrusion molded article according to a third embodiment of the present invention of which the cross-sectional configuration is maintained to a cross-sectional configuration as extruded.
Figure 12:
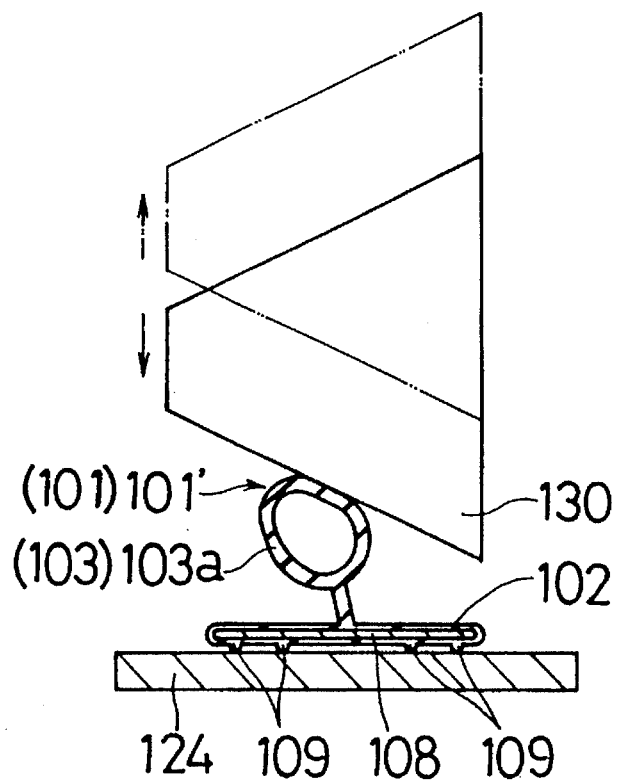
FIG. 12 is a sectional view showing a section of the extrusion molded article of the third embodiment of which the cross-sectional configuration is modified by a shaping roller.

A third embodiment according to the present invention will now be explained with reference to FIGS. 11 and 12.

In the third embodiment, in order to change the cross-sectional configuration of the extrusion molded article 101' during the process from the start of vulcanization thereof to semi-vulcanization thereof, shaping members, preferably rotatable shaping rollers 130 alone are used as shaping means, that is, no leg strip is provided on the extrusion molded article 101'.

A desired number of shaping rollers 130 are provided in a vulcanizing bath and are positioned above the extrusion molded article 101'. The shaping rollers 130 are movable up and down in synchronism with each other. During the process from the start of vulcanization of the extrusion molded article 101' to semi-vulcanization thereof, the shaping rollers 130 are downwardly moved toward a desired part of the extrusion molded article 101' so as to press the section 103a of the sealing portion 103 of the extrusion molded article 101', thereby deforming the section 103a to a required configuration in cross section. After the cross-sectional configuration of the section 103a of the sealing portion 103 of the extrusion molded article 101' is changed over a desired length of the extrusion molded article 101', the shaping rollers 130 are lifted to a stand-by position upwardly away from the extrusion molded article 101'.

In other parts, the third embodiment is substantially identical with the second embodiment. Therefore, any further description will be omitted by applying the same reference numbers to the same parts.

Furthermore, although each of the first to third embodiments exemplifies the case where the long elastic member is a weather strip, the long elastic member is not limited to this. For example, the long elastic member may be a sealing member which is applied to seal a clearance between structural members of a building.

I claim:

1. A method of manufacturing a long elastic member of vulcanized rubber, comprising the steps of:

a) extruding an unvulcanized rubber through an extrusion opening of a die to form an extrusion molded article having a predetermined longitudinal cross-sectional configuration and integrally forming on one surface of said article, by said extruding, a leg strip having a variable degree of projection;

b) conveying said article into and through a vulcanizing bath in which said article is progressively vulcanized during conveying through said bath, said article being conveyed through said bath on a delivery surface, c) contacting an end surface of said leg strip and a portion of said one surface with said delivery surface in said bath during said vulcanizing so as to modify the cross-sectional configuration in a manner dependent on the degree of projection of the leg strip; and d) removing the vulcanized article from the vulcanizing bath to form the long elastic member.

2. The method as defined in claim 1, wherein said conveying takes place with a surface opposite said one surface in contact with a shaping member which is movable toward or away from said opposite surface depending on the degree of projection of said leg strip.

3. The method as defined in claim 2, wherein said opposite surface contacts a shaping roller as said shaping member.

4. The method as defined in claim 1, additionally comprising removing said leg strip from said long elastic member.

* * * * *